Sept. 8, 1931.  W. W. BLAKELY  1,822,389
COUPLING
Filed Sept. 30, 1929
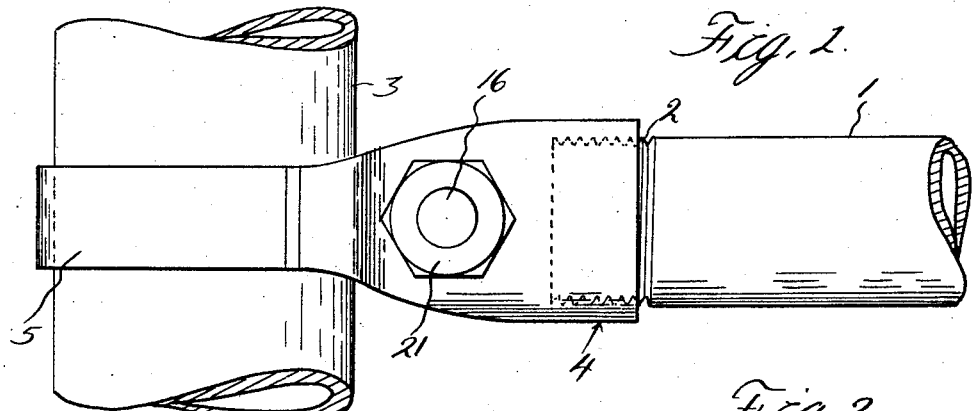
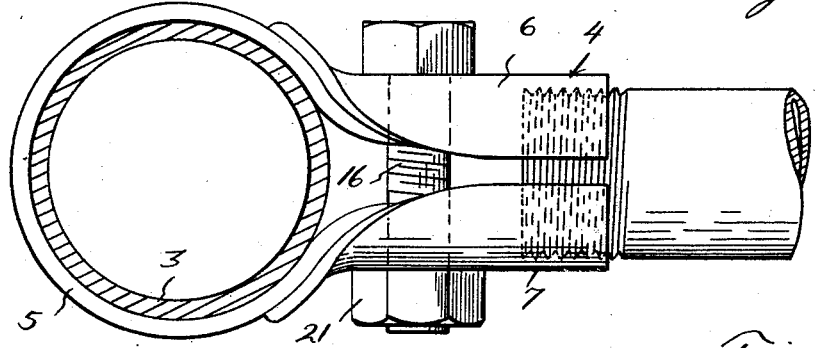
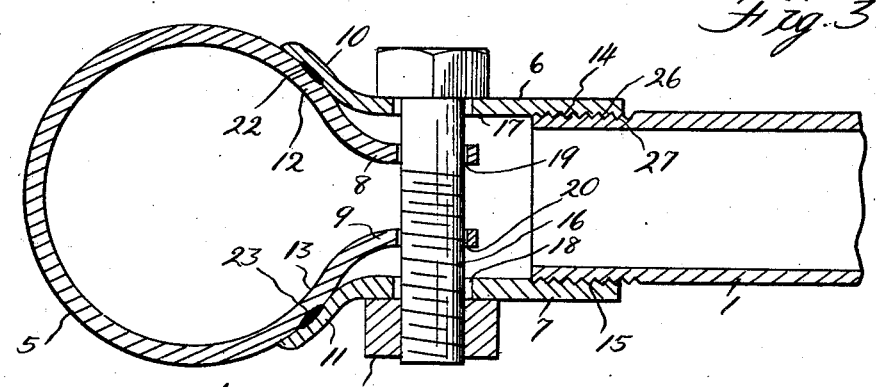
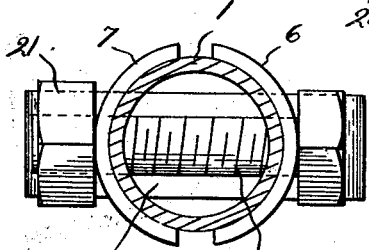
INVENTOR
William W. Blakely
BY
ATTORNEYS Patented Sept. 8, 1931

1,822,389

UNITED STATES PATENT OFFICE

WILLIAM W. BLAKELY, OF DEXTER, MICHIGAN

COUPLING

Application filed September 30, 1929. Serial No. 396,259.

This invention relates generally to couplings and refers more particularly to means for connecting together structural elements such as pipe sections, rods, rails, posts and the like, used in concrete and other fireproof structures and in the construction of fences, guard rails, stairways, etc.

One of the essential objects of the invention is to provide a coupling of this type that may be easily and quickly applied to the elements to be connected and that will effectively hold such elements in juxtaposition.

Another object is to provide a coupling that may be readily applied to pipe sections, rods, rails, etc., having different cross sectional areas and external contours.

Another object is to provide a coupling that is simple in construction and that can be manufactured at a comparatively low cost.

With the above and other objects in view, the invention consists of certain novel features of construction, combinations and arrangements of parts that will be hereinafter more fully described and particularly pointed out in the appended claims.

In the accompanying drawings:

Figure 1 is an elevation of two structural elements with a coupling embodying my invention applied thereto;

Figure 2 is a detail view of the coupling;

Figure 3 is a longitudinal sectional view through the coupling;

Figure 4 is an end elevation of the coupling.

Referring now to the drawings, 1 is a structural element in the form of a pipe having an exteriorly threaded portion 2 at one end, 3 is a structural element in the form of a pipe of larger diameter disposed at substantially right angles to the pipe 1, and 4 is a coupling embodying my invention having a band 5 encircling the pipe 3 and having arms 6 and 7 clamped upon the threaded portion 2 of the pipe 1. As shown, the band 5 and arms 6 and 7 are formed separately and are welded together. Preferably the band is formed of yieldable strap metal and is provided at its opposite ends with lateral arms 8 and 9. The arms 6 and 7 are preferably the same thickness as the band 5, and in the process of construction are blanked to the proper shape and are then pressed to the desired form. Preferably these arms have curved portions 10 and 11 welded to portions 12 and 13 respectively of the band and have transversely curved interiorly threaded portions 14 and 15 for gripping engagement with the threaded portion 2 of the piping 1. If desired the arms 6 and 7 may be integral with the band. A bolt 16 extends through aligned openings 17, 18, 19 and 20 respectively in the arms 6, 7, 8 and 9 and is engaged by a nut 21 to effect the desired clamping action. In this connection however, it will be noted that the welds 22 and 23 between the arms 6 and 7 and the band are preferably in rear of the openings 17, 18, 19 and 20 so that the holding strain is not entirely upon the welds. Moreover, the arms 6 and 7 may be provided with ribs or marginal flanges for stiffening purposes, if desired. In case of stairways or other work where the rails extend at an angle to the posts, the arms 6 and 7 may be blanked in such a way that the welded portions 10 and 11 will be at the proper angle to the transversely curved portions 14 and 15 to give the line desired. In use, the band 5 is slipped upon the pipe 3 while the bolt and nut 16 and 21 respectively are loose. The tube 1 is then inserted between the transversely curved portions 14 and 15 of the arms and the nut and bolt are then tightened to force the threads 26 and 27 respectively of the arms into firm engagement with the threaded portion 2 of the pipe 1. Thus with this construction the parts may be easily and quickly assembled and adjustments may be readily effected by merely loosening the nuts and bolts, moving the coupling longitudinally of the pipe 3 and then again tightening the nut and bolt.

What I claim as my invention is:

1. A coupling comprising a split band of flexible material having substantially parallel arms upon opposite sides of the split provided with aligned openings, a pair of arms substantially parallel to the arms aforesaid, said last mentioned arms being provided intermediate their ends with openings in alignment with the openings in the first mentioned arms and provided at their opposite ends with diverging and interiorly threaded portions respectively, the diverging portions being welded to the band in rear of the aligned openings so that the holding strains are not entirely upon the welds, and actuating means for said band and last mentioned arms including a bolt extending through the aligned openings in the first and last mentioned arms.

2. A coupling comprising a band of flexible material having substantially parallel arms provided with aligned openings, a pair of arms substantially parallel to the arms aforesaid, said last mentioned arms being provided intermediate their ends with openings in alignment with the openings in the first mentioned arms and provided with diverging portions that are welded to the band in rear of the aligned openings so that the holding strains are not entirely upon the welds, and actuating means for said band and last mentioned arms including a bolt extending through the aligned openings in the first and last mentioned arms.

In testimony whereof I affix my signature.

WILLIAM W. BLAKELY.